United States Patent
Bostick et al.

(10) Patent No.: US 10,275,026 B2
(45) Date of Patent: Apr. 30, 2019

(54) REAL-TIME GAMEPLAY ANALYSIS AND ADJUSTMENT BASED ON INFORMATION FROM WEARABLE BIOMETRIC SENSORS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/826,319

(22) Filed: Aug. 14, 2015

(65) Prior Publication Data
US 2017/0045942 A1 Feb. 16, 2017

(51) Int. Cl.
*G06F 3/01* (2006.01)
*A63F 13/65* (2014.01)
(Continued)

(52) U.S. Cl.
CPC ............ *G06F 3/015* (2013.01); *A63F 13/212* (2014.09); *A63F 13/67* (2014.09); *A63F 13/79* (2014.09); *G06F 3/014* (2013.01); *A63F 13/65* (2014.09)

(58) Field of Classification Search
CPC ...... G06F 3/015; G06F 3/014; G07F 17/3206; A63F 13/212; A63F 13/67; A63F 13/79; A63F 13/65
See application file for complete search history.

(56) References Cited

U.S. PATENT DOCUMENTS

| 2011/0009193 A1* | 1/2011 | Bond ................. A63F 13/42 463/36 |
| 2013/0252734 A1* | 9/2013 | Gilliland ............ G07F 17/3262 463/36 |

(Continued)

OTHER PUBLICATIONS

"Wii Vitality Sensor", http://nintendo.wikia.com/wiki/Wii_Vitality_Sensor; retrieved on Jul. 2015.
(Continued)

*Primary Examiner* — David L Lewis
*Assistant Examiner* — Yingchuan Zhang
(74) *Attorney, Agent, or Firm* — Brown & Michaels, PC; Jay Wahlquist

(57) ABSTRACT

Using real-time biometrics of a player during play of a game through a gaming computer to maintain player biometrics within acceptable ranges. When real-time biometric sensor data for a player has fallen out of range of the player biometric thresholds and preferences specific to the player, a query is sent to a central biometric data store to retrieve at least one corrective action which was most effective for other players who exceeded player biometric thresholds and preferences in a same stage of the game being played. At least one corrective action from the query is received and evaluated to determine what corrective action should be taken. A notification is sent to and corrective action applied to the game, such that the corrective action alters the game for the player to return the real-time biometric sensor data of the player to within the range of the player biometric thresholds and preferences.

18 Claims, 8 Drawing Sheets

(51) Int. Cl.
*A63F 13/67* (2014.01)
*A63F 13/79* (2014.01)
*A63F 13/212* (2014.01)

(56) References Cited

U.S. PATENT DOCUMENTS

| | | |
|---|---|---|
| 2013/0280682 A1 | 10/2013 | Levine et al. |
| 2014/0057720 A1 | 2/2014 | Chowdhary et al. |
| 2014/0370959 A1 | 12/2014 | Yacenda |
| 2015/0038204 A1 | 2/2015 | Dugan et al. |
| 2015/0054736 A1* | 2/2015 | Brancato ................ G06F 3/015 345/156 |
| 2016/0109851 A1* | 4/2016 | Tsang .................. G03H 1/0866 359/9 |

OTHER PUBLICATIONS

Roberts, S. "Biometric headset increases game difficulty for angry players", http://www.gizmag.com/biometric-headset-angry-players/30539/; Jan. 2014.
Conati et al. "A Study on Using Biometric Sensors for Monitoring User Emotions in Educational Games." In Workshop on Assessing and Adapting to User Attitudes and Affect: Why, When, and How? User Modeling; 2003.

\* cited by examiner

REAL-TIME GAMEPLAY ANALYSIS AND ADJUSTMENT BASED ON INFORMATION FROM WEARABLE BIOMETRIC SENSORS

BACKGROUND

The present invention relates to biometric data analysis, and more specifically to adjustment of gameplay in regards to real-time game play analysis based on biometric information from biometric sensors worn by the user.

Biometric sensing of data through wearable biometric sensors gathers data regarding the user in real-time. The data sensed by the biometric sensor s may include, but is not limited to: blood pressure, stress level, skin temperature, perspiration, calories burned, physical activity, respiratory rate, sleep, weight, heart rate, hydration, nutrition and blood sugar.

SUMMARY

According to one embodiment of the present invention, a method of using real-time biometrics of a player during play of a game through a gaming computer to maintain player biometrics within acceptable ranges is disclosed. The method comprising: the gaming computer receiving real-time biometric sensor data from a wearable biometric sensor on the player; the gaming computer correlating the real-time biometric sensor data with stages of the game being played; and the gaming computer comparing the real-time biometric sensor data to ranges of player biometric thresholds and preferences specific to the player. When the real-time biometric sensor data has fallen out of range of the player biometric thresholds and preferences specific to the player, the gaming computer: sending a query to a central biometric data store to retrieve at least one corrective action which was most effective for other players who exceeded player biometric thresholds and preferences in a same stage of the game being played; receiving and evaluating the at least one corrective action from the query to determine what corrective action should be taken; and sending a notification to the game to apply the corrective action to the game, such that the corrective action alters the game for the player to return the real-time biometric sensor data of the player to within the range of the player biometric thresholds and preferences.

According to another embodiment of the present invention, a computer program product for using real-time biometrics of a player during play of a game through a gaming computer to maintain player biometrics within acceptable ranges is disclosed. The computer program product comprising a gaming computer comprising at least one processor, one or more memories, one or more computer readable storage media, the computer program product comprising a computer readable storage medium having program instructions embodied therewith. The program instructions executable by the computer to perform a method comprising: receiving, by the gaming computer, real-time biometric sensor data from a wearable biometric sensor on the player; correlating, by the gaming computer, the real-time biometric sensor data with stages of the game being played; and comparing, by the gaming computer, the real-time biometric sensor data to ranges of player biometric thresholds and preferences specific to the player. When the real-time biometric sensor data has fallen out of range of the player biometric thresholds and preferences specific to the player, the gaming computer: sending a query to a central biometric data store to retrieve at least one corrective action which was most effective for other players who exceeded player biometric thresholds and preferences in a same stage of the game being played; receiving and evaluating the at least one corrective action from the query to determine what corrective action should be taken; and sending a notification to the game to apply the corrective action to the game, such that the corrective action alters the game for the player to return the real-time biometric sensor data of the player to within the range of the player biometric thresholds and preferences.

According to another embodiment of the present invention, a computer system for using real-time biometrics of a player during play of a game through a gaming computer to maintain player biometrics within acceptable ranges. The computer system comprising a gaming computer comprising at least one processor, one or more memories, one or more computer readable storage media having program instructions executable by the computer to perform program instructions. The program instructions comprising: receiving, by the gaming computer, real-time biometric sensor data from a wearable biometric sensor on the player; and correlating, by the gaming computer, the real-time biometric sensor data with stages of the game being played; comparing, by the gaming computer, the real-time biometric sensor data to ranges of player biometric thresholds and preferences specific to the player. When the real-time biometric sensor data has fallen out of range of the player biometric thresholds and preferences specific to the player, the gaming computer performing the program instructions comprising: sending a query to a central biometric data store to retrieve at least one corrective action which was most effective for other players who exceeded player biometric thresholds and preferences in a same stage of the game being played; receiving and evaluating the at least one corrective action from the query to determine what corrective action should be taken; and sending a notification to the game to apply the corrective action to the game, such that the corrective action alters the game for the player to return the real-time biometric sensor data of the player to within the range of the player biometric thresholds and preferences.

DETAILED DESCRIPTION

Figure 1:
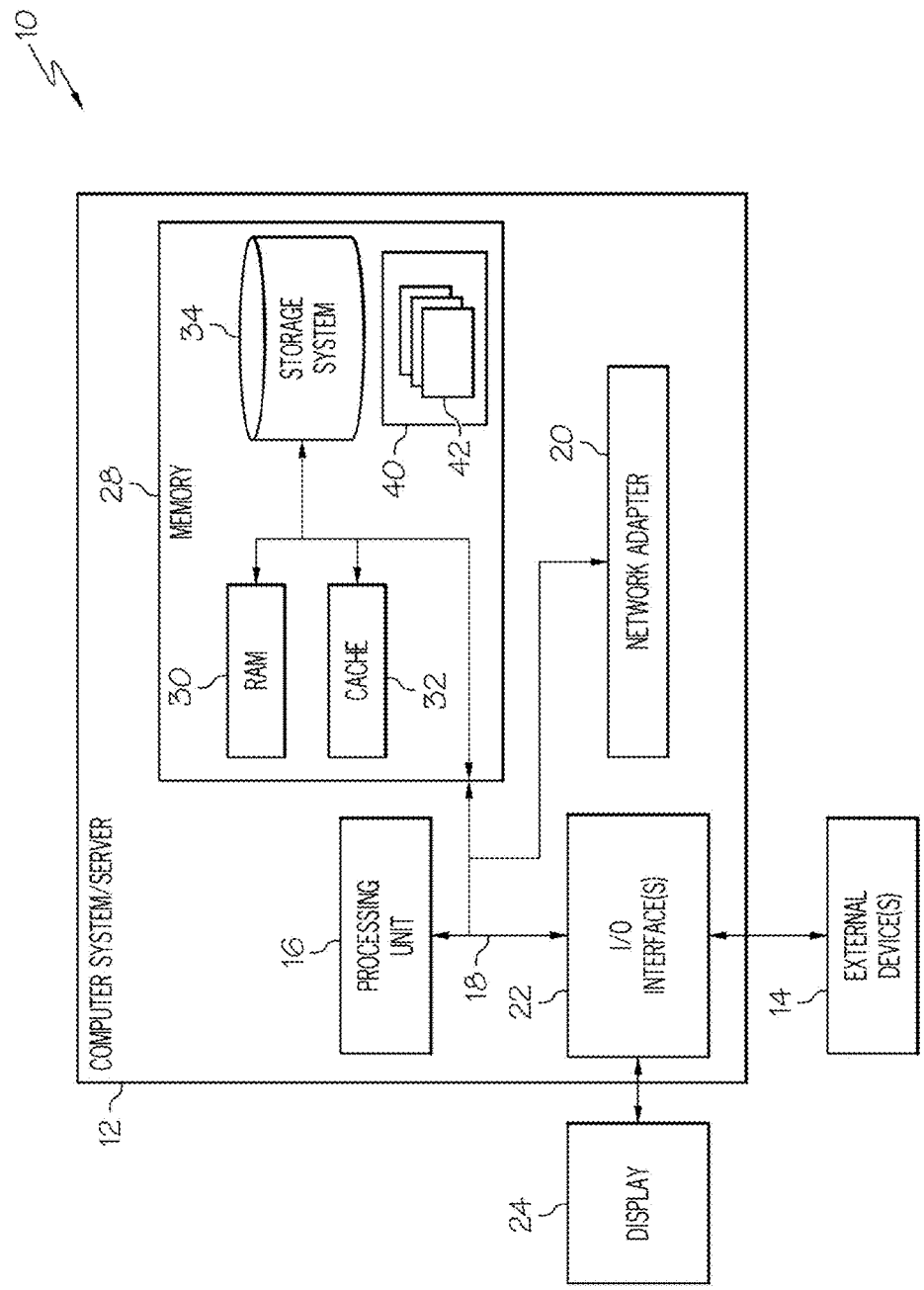
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
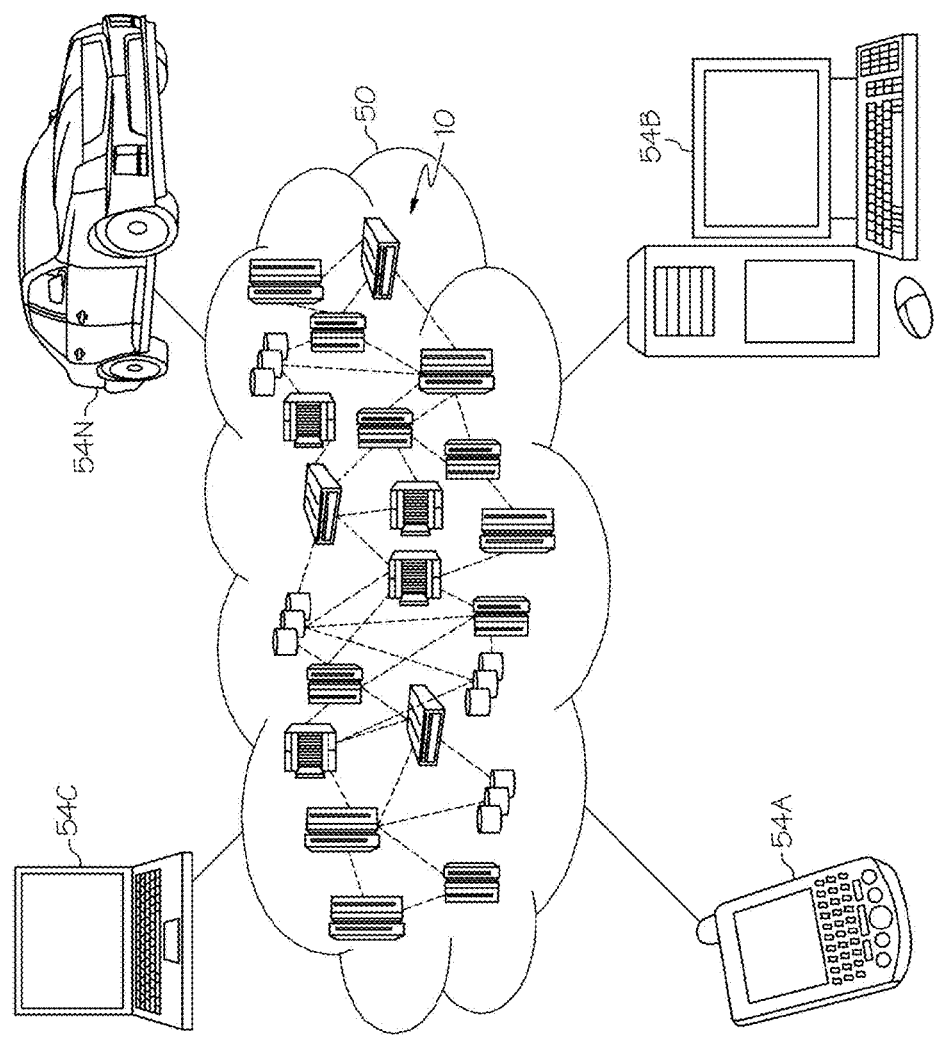
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
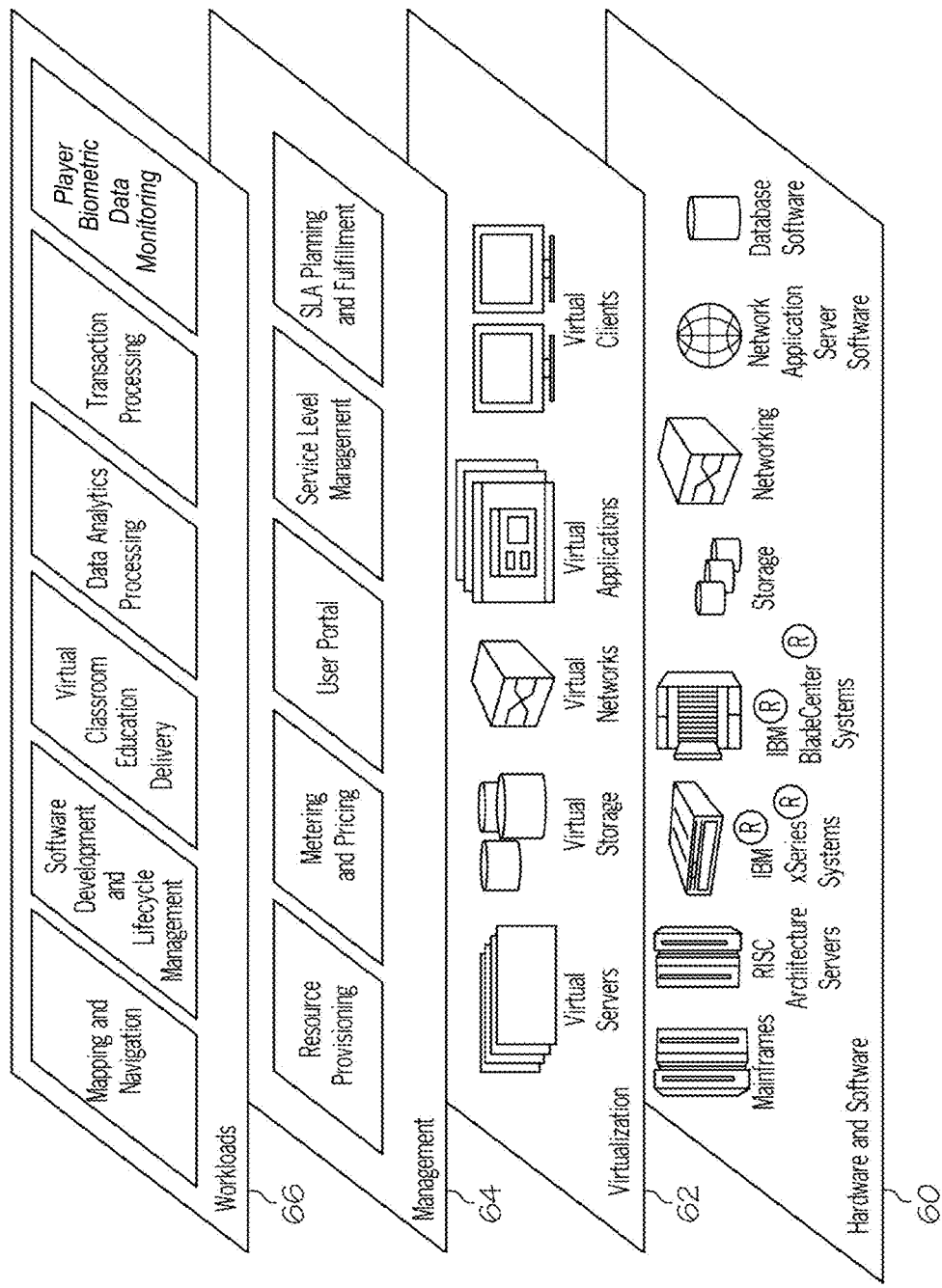
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and player biometric data monitoring.

Figure 4:
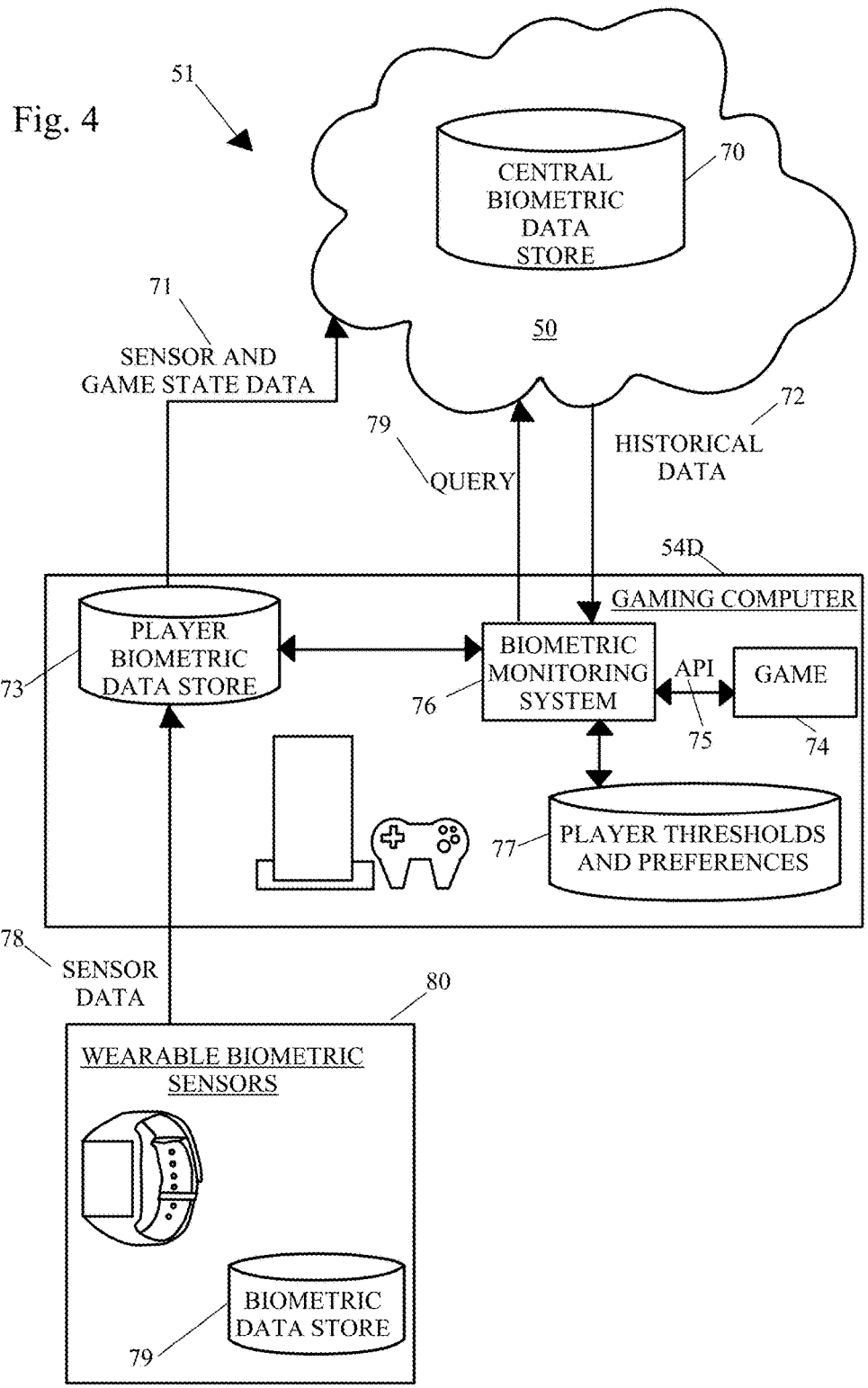
FIG. 4 depicts an example of a cloud computing environment according to an embodiment of the present invention.

FIG. 4 depicts an example of a cloud computing environment 50, within which is a central biometric data store 70, which may be on one of the computer system/servers 12 (FIG. 2) in the cloud computing node 10 (FIG. 2). The central biometric data store 70 preferably includes copies of every player's biometric data store records and any associated corrective actions.

The node 10 is preferably in communication with a local computer device, such as a gaming computer 54D. The gaming computer 54D may include a player biometric data store 73, a biometric monitoring system 76, player thresholds and preferences data store 77, and game software or game 74. The gaming computer 54D is preferably in communication with a wearable biometric sensor 80. The wearable biometric sensor 80 may contain one or many biometric sensors. The wearable biometric sensor 80 obtains and stores sensor data regarding the user or player and stores sensor data in a biometric data store 79. The wearable biometric sensor 80 may communicate with the gaming computer 54D via Wi-Fi®, BlueTooth®, infra-red or other similar technology.

The player biometric data store 73 of the gaming computer 54D is in communication with the wearable biometric sensor 80 being worn by the gamer or user. The player biometric data store 73 stores real-time sensor data 78 regarding the player's biometrics from the wearable biometric sensor 80.

The player biometric data store 73 is also in communication with the biometric monitoring system 76. The biometric monitoring system 76 provides an interface between the biometric sensor data and the game 74 the user is playing and correlates the real-time biometric sensor data received from the wearable biometric sensors 80 to a specific level or time sequence of the game being played.

The biometric monitoring system 76 interfaces with the game 74 via an application program interface (API) 75. The real-time sensor data 78 is stored in the player biometric data store 73 with what portion of the game or level the user is playing as provided by the biometric monitoring system 76.

The player biometric data store 73 can communicate the real-time sensor data as it relates to the state or level of the game 71 to the central biometric data store 70 within the node 10. Furthermore, the player biometric data store 73 communicates with central biometric data store 70 within the node 10 to periodically send sensor data and associated game state, as well as any issued corrective actions executed during game play for the user.

The biometric monitoring system 76 also communicates with a player threshold and preferences data store 77, which stores biometric thresholds and biometric range preferences associated with play for the user.

The biometric monitoring system 76 monitors the biometric sensor data 78 to determine whether the biometric sensor data has fallen out of range of a threshold or preferences.

The biometric monitoring system 76 may send queries 79 to central biometric data store 70 as well as receive historical data 72 regarding sensor data and associated game play corrective actions associated with multiple players for the same game from the central biometric data store 70 based on the query 79.

Figure 5:
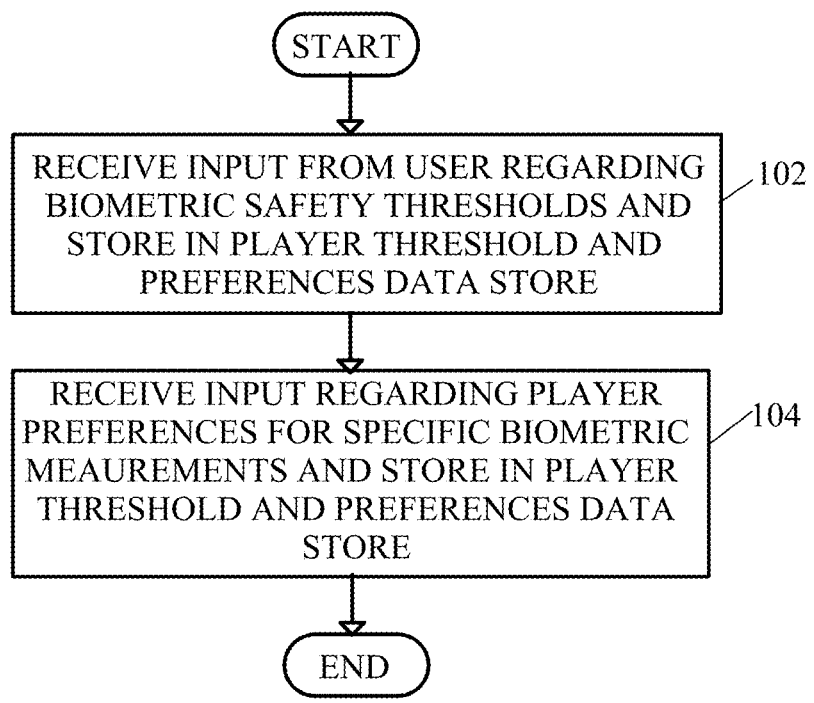
FIG. 5 shows a flow diagram of a method of defining player biometric safety thresholds and biometric range preferences.

FIG. 5 shows a flow diagram of a method of defining player biometric safety thresholds and biometric range preferences. Prior to a player initiating a game, a player can define biometric threshold and preferences ranges they wish to maintain during gameplay.

The player may define a safety threshold range, which is range in which the player's biometric data is "safe" within. For example, a player's pulse should not exceed 120 beats per minute or their blood pressure must remain below a diastolic reading of 95 during gameplay. The player may also set preferential ranges for specific biometric measurements. For example, a player can set a threshold for stress levels for all games play (e.g. Medium stress), or that their heart rate is maintained between 90 and 110 beats per minute.

In a first step (step 102), a biometric monitoring system 76 of the gaming computer 54D receives input from a user or player regarding safety thresholds and stores the input in the player thresholds and preferences data store 77. The biometric monitoring system 76 also receives input regarding player preferences for specific biometric measurements and the input is stored in the player thresholds and preferences data store 77 (step 104) and the methods ends.

In an alternate embodiment, the safety thresholds maybe preset by the biometric monitoring system 76 based on a player's known attributes such as age, gender and weight, which may be supplied by the user.

Figure 6:
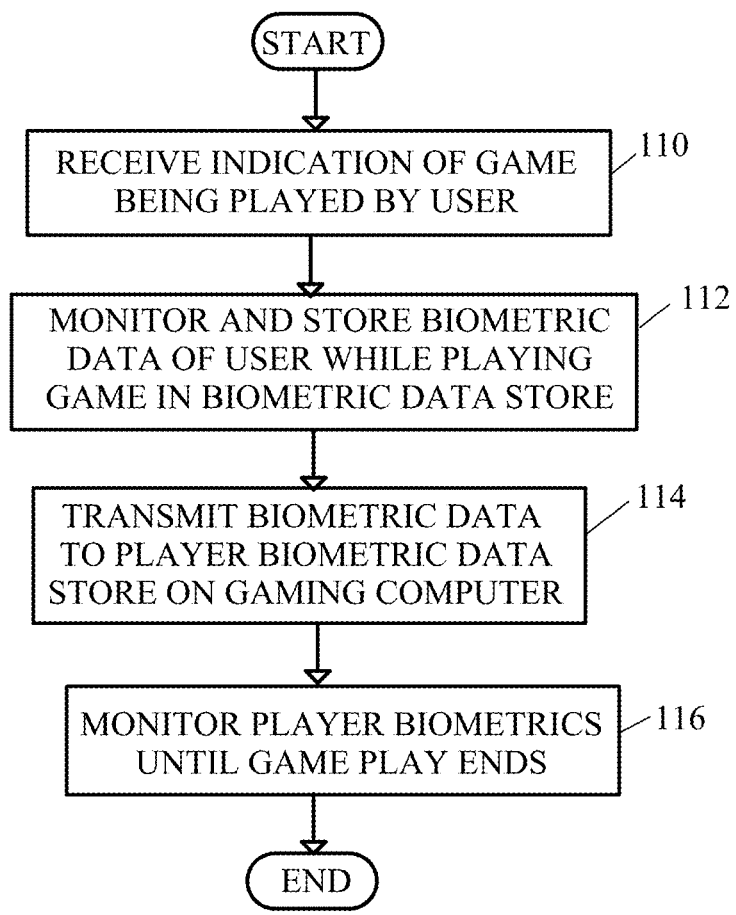
FIG. 6 shows a flow diagram of a method of monitoring biometrics during gameplay by wearable biometric sensors on the player.

FIG. 6 shows a flow diagram of a method of monitoring biometrics during gameplay by wearable biometric sensor worn by the player.

In a first step (step 110), the wearable biometric sensor 80 of the player receives an indication that a game is being played by the wearer. The indication can be manually provided by the wearer or player or can be detected by the biometric sensors.

The wearable biometric sensor 80 monitors and stores biometric data of the user while playing the game in real-time in a biometric data store 79 (step 112). The biometric data may include, but is not limited to a player's pulse, blood pressure, skin temperature, perspiration, and stress level.

The real-time biometric data is transmitted from the wearable biometric sensor 80 to the gaming computer 54D and stored in the player biometric data store 73 of the gaming computer 54D (step 114). The transmission may be through the Internet, wi-fi, BlueTooth®, or other similar technology. The player's biometrics are continuously monitored and sent to the biometric monitoring system 76 until game play ends (step 113). The ending of game play be manually indicated by the user, sent by the gaming platform to the wearable biometric sensor 80 or detected by the wearable biometric sensor 80.

Figure 7:
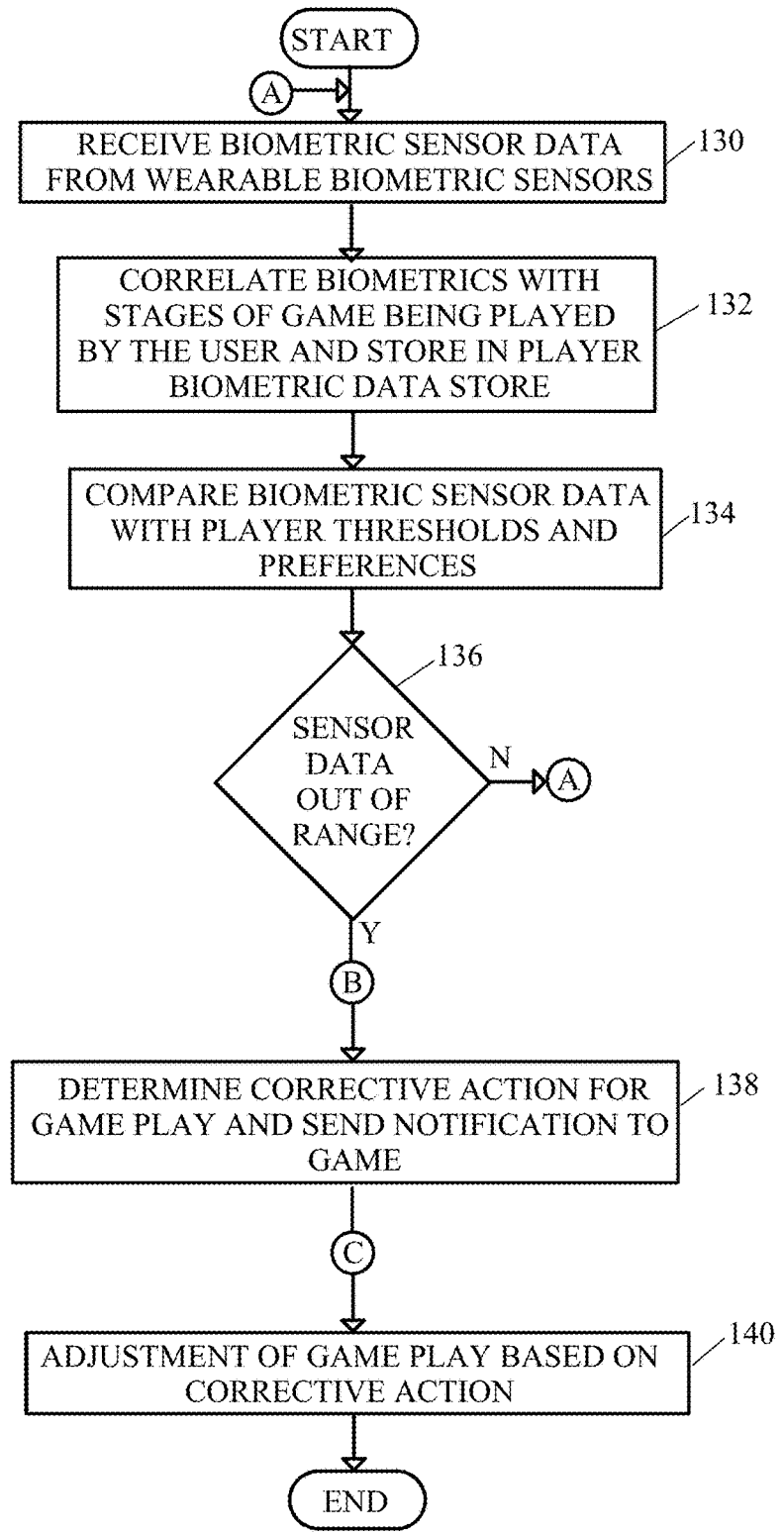
FIG. 7 shows a flow diagram of a method of a biometric monitoring system of a gaming computer monitoring real-time biometrics of a player during gameplay and determining game play corrective action to alter the biometrics of the player to within acceptable ranges.

FIG. 7 shows a flow diagram of a method of a biometric monitoring system of a gaming computer monitoring real-time biometrics of a player during gameplay and determining game play corrective action to alter the biometrics of the player to within acceptable ranges.

In a first step (step 130), the biometric monitoring system 76 receives real-time biometric sensor data from the wearable biometric sensor 80.

The real-time biometric data received is then correlated with what portion of the game is being played (step 132), for example level, stage, sequence chapter, etc. . . . An example of the correlation of real-time biometric data and game stage is shown in Table 1 below. The correlated data is then stored in the player biometric data store 75.

TABLE 1

| Game State | | | Biometric Sensor Data | | | |
|---|---|---|---|---|---|---|
| Game | Level | Activity | Pulse | Blood Pressure | Stress | ... |
| Game A | 1.1 | Seq A | 75 | 115/75 | Low | ... |
| Game A | 1.1 | Seq B | 90 | 130/85 | High | ... |
| Game A | 1.2 | Seq A | 80 | 118/80 | Medium | ... |
| ... | ... | ... | ... | ... | ... | ... |

The biometric monitoring system 76 compares the real-time biometric sensor data with player thresholds and preferences from the player thresholds and preferences data store 77 (step 134). If the real-time biometric sensor data does not fall out of range (step 136), the method returns to step 130 of receiving real-time biometric sensor data.

If the real-time biometric sensor data falls out of range (step 136), the biometric monitoring system 76 determines corrective action for game play and sends a notification to the game (step 138). The notification may be sent to the game 74 via the API interface 75. The corrective action is any adjustment of the game play which brings or causes the real-time biometric sensor data to fall back within the range or preferences of the user or player. The corrective action may be to pause the game, alter the intensity level, alter the difficulty of completing a task within the game play, or alter other aspects of game play.

The game play is adjusted based on the corrective action (step 140) and the method ends.

Figure 8:
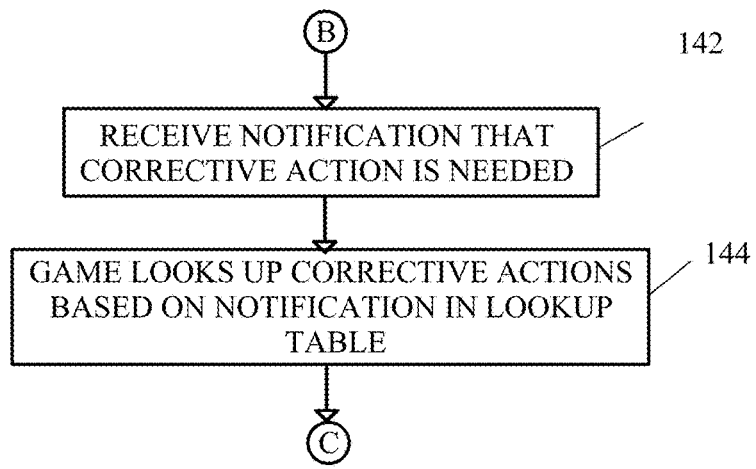
FIG. 8 shows a flow diagram of a method of determining corrective action for game play of a first embodiment.

FIG. 8 shows a flow diagram of a method of determining corrective action for game play of a first embodiment. In this embodiment, the corrective action is pre-determined, in that the developer of the game itself has included corrective actions and executable software within the game which will execute based on the notification received from the biometric monitoring system 76, causing the game 74 to adjust accordingly.

Step 138 of FIG. 7 may further include the steps of the game receiving notification that corrective action is needed (step 142) from the biometric monitoring system 76 and the game 74 looking up the corrective action based on the received notification in a lookup table (step 144) and the method returns to step 140 where the game play is adjusted based on the corrective action received from the lookup table within the game.

For example, if the game receives a notification that the player's blood pressure has fallen out of range (too high), the game would lookup the notification to obtain a corrective action, which in this case is pausing the game. The game then pauses, allowing the player's blood pressure to return to within the player's acceptable range.

Figure 9:
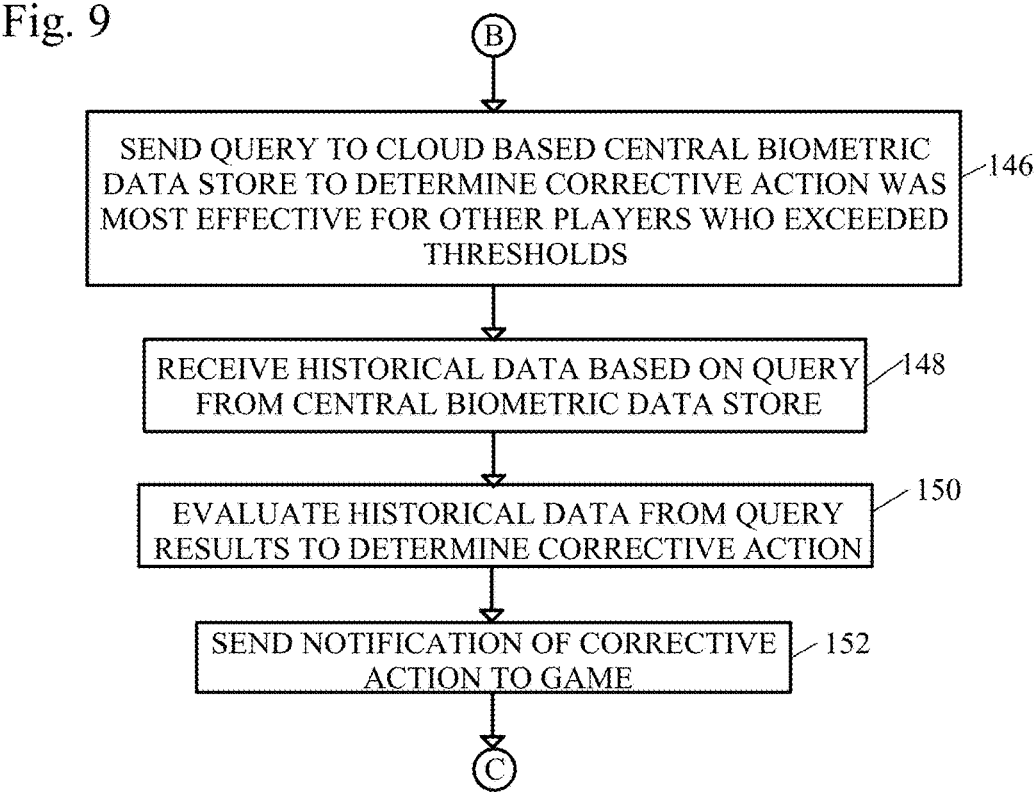
FIG. 9 shows a flow diagram of a method of determining corrective action for game play of an alternate embodiment.

FIG. 9 shows a flow diagram of a method of determining corrective action for game play of an alternate embodiment. In this embodiment, the corrective action is determined based on historical data and is directed by the biometric monitoring system 76.

Step 138 of FIG. 7 may further include steps 146-152. The biometric monitoring system 76 sends a query to a cloud-based central biometric data store 70 to determine a corrective action which was most effective for other players who fell out of range or preferences during this stage or sequence of the game (step 146). The biometric monitoring system 76 receives historical data based on the query from the central biometric data store 70 (step 148). The biometric monitoring system 76 evaluates the historical data from the query results to recommend and determine the corrective action (step 150) and notification of the corrective action for the game to take is sent to the game (step 152) through the API interface 75 and the method returns to step 140, where the game play is adjusted based on the corrective action received.

For example, a query for high stress level for game A may be sent to the cloud-based central biometric data store 70 to determine a corrective action which was most effective for other players who fell out of range or preferences during this stage of the game, such as level 1.1, sequence B as shown in Table 1 above. Historical data received from the cloud-based central biometric data store 70 is then evaluated by the biometric monitoring system 76. The evaluation of the historical data may show that reducing the game difficulty of opponents (weakened opponents) in the game at this particular stage reduced stress levels of players 90% of the time. The biometric monitoring system 76 would then send a notification to reduce the difficulty of the opponents to the game.

It should be noted that the corrective action and monitoring of biometric information is preferably applicable in single player games. In an alternate embodiment, the game may be a multi-player game.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of using real-time biometrics of a player during play of a game through a gaming computer to maintain player biometrics within acceptable ranges comprising:
   the gaming computer receiving real-time biometric sensor data from a wearable biometric sensor on the player;
   the gaming computer correlating the real-time biometric sensor data with stages of the game being played;
   the gaming computer comparing the real-time biometric sensor data to ranges of player biometric thresholds and preferences specific to the player set by the player prior to game play;
   when the real-time biometric sensor data has fallen out of range of the player biometric thresholds and preferences specific to the player set by the player prior to game play, the gaming computer:
      sending a query to a central biometric data store to retrieve at least one corrective action which was most effective for other players who exceeded player biometric thresholds based on historical data of the other players and preferences set by the player prior to game play in a same stage of the game being played;
      receiving and evaluating the at least one corrective action from the query to determine what corrective action should be taken; and
      sending a notification to the game to apply the corrective action to the game, such that the corrective action alters the game for the player to return the real-time biometric sensor data of the player to within the range of the player biometric thresholds and preferences set by the player prior to game play.

2. The method of claim 1, wherein the gaming computer further comprises:
   a data store of player biometric thresholds and preferences specific to the player;

a data store of real-time biometric sensor data from the wearable biometric sensor worn by the player; and a biometric monitoring system interfaced with the game, and in communication with the data store of player biometric thresholds and preferences specific to the player, the data store of real-time biometric sensor data from the wearable biometric sensor worn by the player and the central biometric data store.

3. The method of claim 1, wherein the real-time biometric sensor data and correlated stage pertaining to the player of the game is periodically sent to the central biometric data store.

4. The method of claim 1, wherein the corrective action is alter the intensity level of the game.

5. The method of claim 1, wherein the corrective action is alter the difficulty of completing a task within the game.

6. The method of claim 1, wherein the corrective action is halting play of the game.

7. A computer program product for using real-time biometrics of a player during play of a game through a gaming computer to maintain player biometrics within acceptable ranges, a gaming computer comprising at least one processor, one or more memories, one or more computer readable storage media, the computer program product comprising a computer readable storage medium having program instructions embodied therewith, the program instructions executable by the computer to perform a method comprising:

receiving, by the gaming computer, real-time biometric sensor data from a wearable biometric sensor on the player;

correlating, by the gaming computer, the real-time biometric sensor data with stages of the game being played;

comparing, by the gaming computer, the real-time biometric sensor data to ranges of player biometric thresholds and preferences specific to the player set by the player prior to game play;

when the real-time biometric sensor data has fallen out of range of the player biometric thresholds and preferences specific to the player set by the player prior to game play, the gaming computer:

sending a query to a central biometric data store to retrieve at least one corrective action which was most effective for other players who exceeded player biometric thresholds based on historical data of the other players and preferences set by the player prior to game play in a same stage of the game being played;

receiving and evaluating the at least one corrective action from the query to determine what corrective action should be taken; and sending a notification to the game to apply the corrective action to the game, such that the corrective action alters the game for the player to return the real-time biometric sensor data of the player to within the range of the player biometric thresholds and preferences set by the player prior to game play.

8. The computer program product of claim 7, wherein the gaming computer further comprises:

a data store of player biometric thresholds and preferences specific to the player;

a data store of real-time biometric sensor data from the wearable biometric sensor worn by the player; and a biometric monitoring system interfaced with the game, and in communication with the data store of player biometric thresholds and preferences specific to the player, the data store of real-time biometric sensor data from the wearable biometric sensor worn by the player and the central biometric data store.

9. The computer program product of claim 7, wherein the real-time biometric sensor data and correlated stage pertaining to the player of the game is periodically sent to the central biometric data store.

10. The computer program product of claim 7, wherein the corrective action is alter the intensity level of the game.

11. The computer program product of claim 7, wherein the corrective action is alter the difficulty of completing a task within the game.

12. The computer program product of claim 7, wherein the corrective action is halting play of the game.

13. A computer system for using real-time biometrics of a player during play of a game through a gaming computer to maintain player biometrics within acceptable ranges, comprising a gaming computer comprising at least one processor, one or more memories, one or more computer readable storage media having program instructions executable by the computer to perform the program instructions comprising:

receiving, by the gaming computer, real-time biometric sensor data from a wearable biometric sensor on the player;

correlating, by the gaming computer, the real-time biometric sensor data with stages of the game being played;

comparing, by the gaming computer, the real-time biometric sensor data to ranges of player biometric thresholds and preferences specific to the player set by the player prior to game play;

when the real-time biometric sensor data has fallen out of range of the player biometric thresholds and preferences specific to the player set by the player prior to game play, the gaming computer performing the program instructions comprising:

sending a query to a central biometric data store to retrieve at least one corrective action which was most effective for other players who exceeded player biometric thresholds based on historical data of the other players and preferences set by the player prior to game play in a same stage of the game being played;

receiving and evaluating the at least one corrective action from the query to determine what corrective action should be taken; and sending a notification to the game to apply the corrective action to the game, such that the corrective action alters the game for the player to return the real-time biometric sensor data of the player to within the range of the player biometric thresholds and preferences set by the player prior to game play.

14. The computer system of claim 13, wherein the gaming computer further comprises:

a data store of player biometric thresholds and preferences specific to the player;

a data store of real-time biometric sensor data from the wearable biometric sensor worn by the player; and a biometric monitoring system interfaced with the game, and in communication with the data store of player biometric thresholds and preferences specific to the player, the data store of real-time biometric sensor data from the wearable biometric sensor worn by the player and the central biometric data store.

15. The computer system of claim 13, wherein the real-time biometric sensor data and correlated stage pertaining to the player of the game is periodically sent to the central biometric data store.

16. The computer system of claim 13, wherein the corrective action is alter the intensity level of the game.

17. The computer system of claim 13, wherein the corrective action is alter the difficulty of completing a task within the game.

18. The computer system of claim 13, wherein the corrective action is halting play of the game.

* * * * *